No. 770,426. PATENTED SEPT. 20, 1904.
C. FRANK.
COFFEE POT.
APPLICATION FILED FEB. 20, 1903.
NO MODEL. 2 SHEETS—SHEET 1.
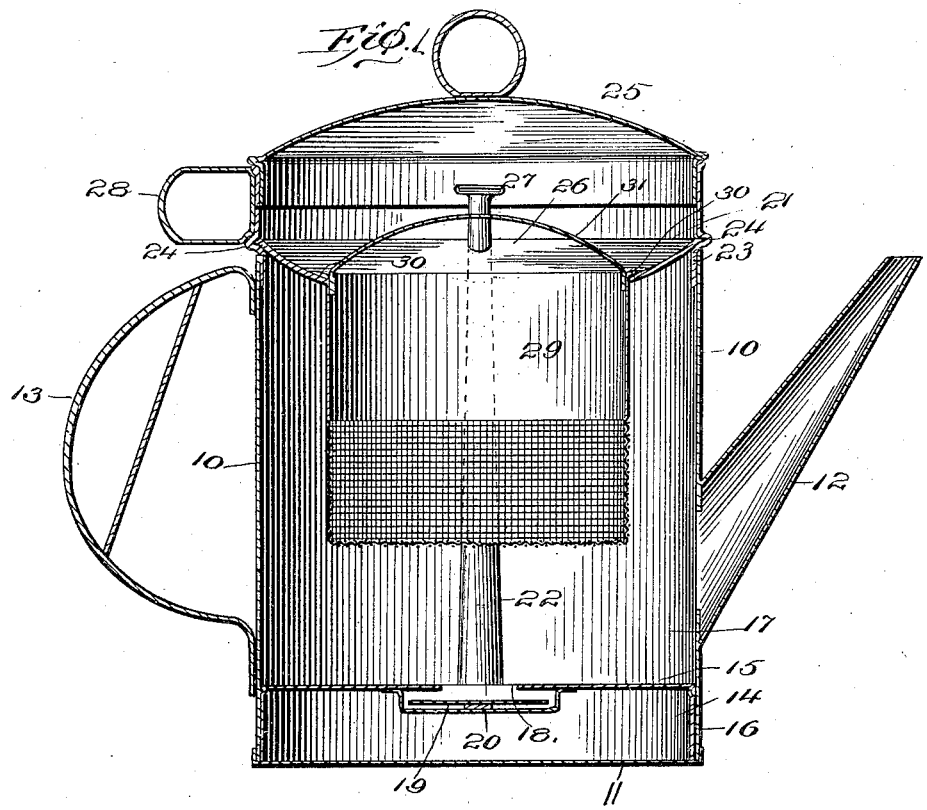
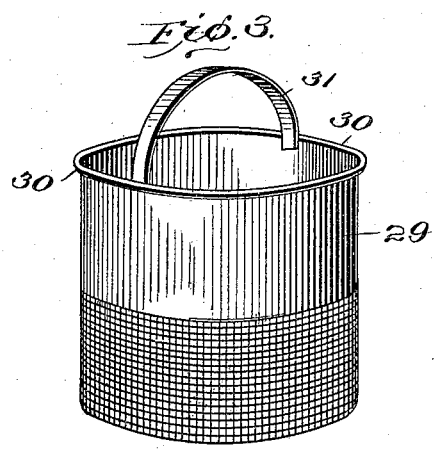
Witnesses
J. M. Fowler Jr.
M. J. Dixon
Inventor
Charles Frank
by
Grant Burroughs
Attorney No. 770,426. PATENTED SEPT. 20, 1904.
C. FRANK.
COFFEE POT.
APPLICATION FILED FEB. 20, 1903.
NO MODEL. 2 SHEETS—SHEET 2.
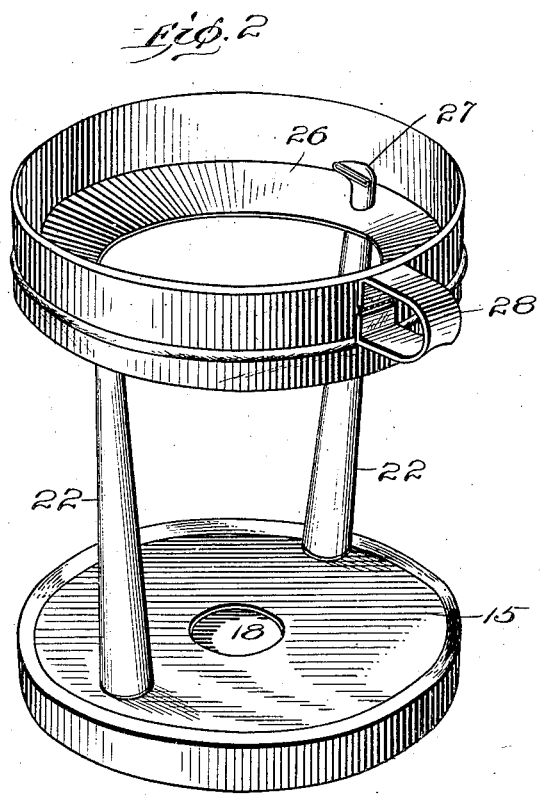
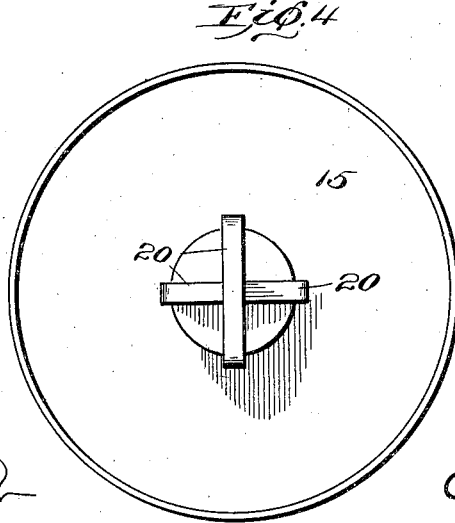
Witnesses
J. M. Fowler Jr
M. J. Dixon
Inventor
Charles Frank
by
Grant Burroughs
Attorney No. 770,426. Patented September 20, 1904.

UNITED STATES PATENT OFFICE.

CHARLES FRANK, OF ALBANY, GEORGIA, ASSIGNOR OF ONE-HALF TO DAVID NEUMAN, OF ALBANY, GEORGIA.

COFFEE-POT.

SPECIFICATION forming part of Letters Patent No. 770,426, dated September 20, 1904.

Application filed February 20, 1903. Serial No. 144,181. (No model.)

*To all whom it may concern:*

Be it known that I, CHARLES FRANK, a citizen of the United States, and a resident of Albany, in the county of Dougherty and State of Georgia, have invented certain new and useful Improvements in Coffee-Pots, of which the following is a full, clear, and exact description, such as will enable those skilled in the art to which it appertains to make and use the same, reference being had to the accompanying drawings, forming a part of this specification.

The invention relates to improvements in devices for treating coffee and like substances to form beverages.

It relates more particularly to that class of coffee-pots that are provided with apparatus for causing the liquid to circulate through the vessel and to pass repeatedly through the material to be treated.

It consists in the novel construction, combination, and arrangement of parts, such as will be hereinafter fully described, pointed out in the appended claim, and illustrated in the accompanying drawings.

In the drawings, in which similar reference characters designate corresponding parts, Figure 1 is a vertical sectional view of a device embodying the invention. Fig. 2 is a perspective view of part of the circulating apparatus. Fig. 3 is a perspective view of the receptacle for holding the material to be treated. Fig. 4 is a plan view of the under side of the false bottom, showing the valve mechanism.

The outer casing of the device may be of any construction suitable in the premises. In the present instance it consists of the cylindrical wall 10 and the bottom 11 and is provided with the usual spout 12 and handle 13. Fitted in this outer or main casing is the apparatus for holding the material to be treated and for causing the liquid to circulate.

When the parts are assembled, a chamber 14 is formed in the lower part of the main casing by the false bottom 15, the circular wall 16, projecting downwardly from the periphery of the false bottom, and the true bottom 11. The chamber 14 is connected with the main chamber 17 of the vessel by the opening 18 in the false bottom. The passage through the opening 18 is controlled by the valve 19, guided and held in place by the cross-pieces 20, secured to the false bottom.

Leading from the chamber 14 in the lower part of the main casing to the chamber 21 in the upper part of the main casing are the tubes 22 in opposite sides of the main casing. The chamber 21 is formed by the auxiliary casing 23, fitted into the upper end of the main casing. A flange 24 projects from the periphery of the auxiliary casing and is adapted to rest on the upper edge of the main casing. A cover 25 is provided for closing the upper end of the auxiliary casing.

The lower ends of the tubes 22 are secured to the false bottom 15 and taper upwardly. The upper ends of the tubes pass through the dish-shaped annular plate 26, projecting from the inner side of the auxiliary casing 23, in which plate the tubes are secured. The upper ends of the tubes are bent inwardly and are flattened, as at 27, so as to spray the fluid passing from the same. The auxiliary casing is provided with a handle 28, and as the plate 26 and the false bottom are secured together by the tubes 22 most all of the circulating apparatus can be removed from the main casing by said handle.

A receptacle 29 for holding the material to be treated is placed in the annular plate 26. The receptacle has a reticulated lower part, and projecting from its upper edge is a flange 30, adapted to engage with the inner edge of the plate 26 to hold the receptacle in place. The receptacle when in place is in a position to receive the discharge from the upper ends of the tubes 22. It is provided with a bail 31 to facilitate the handling of the same.

In vessels of large size it is obvious that the handles 13 and 28 of the main and auxiliary casings, respectively, may be replaced by bails to facilitate the moving of the casings.

The operation of the device is as follows: The vessel, after the required amount of water is turned into the same and the material to be treated placed in the reticulated receptacle, is subjected to the action of heat in the usual way. Part of the water on being turned into the vessel passes from the main chamber 17 through the opening 18 into the chamber 14. This flow of water is permitted, as the valve 19 normally rests by gravity on the cross-pieces 20 and leaves the passage through the opening 18 unobstructed. As the liquid in the chamber 14 becomes heated and steam generated the ebullition of the liquid and the pressure of the steam will raise the valve to close the opening 18. The pressure of the steam then forces the mixture of water and steam from the chamber 14 upwardly through the tubes 22, from which it is sprayed upon the contents of the reticulated receptacle. The steam and water on coming in contact with the material leaches the same and forms the decoction, which passes into the main chamber 17. As the pressure in the chamber 14 is relieved by the escape of the steam through the tubes 22 the valve 19 drops and permits the chamber to be again filled with the liquid from the chamber 17 through the opening 18. In this way the liquid is intermittently circulated through the material to be treated until the process of forming the decoction is completed.

Having thus described my invention, what I claim, and desire to secure by Letters Patent, is—

In a circulating coffee-pot, the main casing forming the main chamber, a false bottom placed in the lower part of said main casing to form a chamber therein beneath the main chamber and provided with a central opening to form a communication between said main chamber and the chamber beneath the main chamber, a movable valve controlling said communication and operating to intermittently close the same, an auxiliary casing removably mounted in the upper part of said main casing and forming an upper extension of said main casing, an annular plate projecting from the inner face of said auxiliary casing and forming in said auxiliary casing a chamber above said main chamber, a removable cover for said auxiliary casing, a reticulated receptacle removably seated in said annular plate, and tubes secured to said false bottom and passing through and secured in said annular plate and opening into said chamber in said auxiliary casing and forming passages leading from the chamber beneath the main chamber to the one in the auxiliary casing.

In testimony whereof I hereunto affix my signature in the presence of two witnesses.

CHARLES FRANK.

Witnesses:
W. H. HESTER,
EDWIN STERNE.